Sept. 20, 1949.   G. E. KING   2,482,492

CONTROL SYSTEM

Original Filed Nov. 16, 1944

WITNESSES:
Robert C. Baird
E. F. Oberheim

INVENTOR
George E. King.
BY
Paul E. Friedemann
ATTORNEY

Patented Sept. 20, 1949

2,482,492

UNITED STATES PATENT OFFICE 2,482,492

CONTROL SYSTEM

George E. King, Pittsburgh, Pa., assignor to Westinghouse Electric Corporation, East Pittsburgh, Pa., a corporation of Pennsylvania Original application November 16, 1944, Serial No. 563,754. Divided and this application July 15, 1947, Serial No. 761,133

7 Claims. (Cl. 318—327)

This invention relates, generally, to constant current electric drives and, more particularly, to a constant current electric drive which embodies a plurality of driving motors in which the armature currents of the motors are maintained at a constant value by means of a specially designed generator or a generator with a constant current regulator.

This application is a division of my copending application Serial No. 563,754, filed November 16, 1944, entitled "Control systems," now United States Patent 2,438,010, granted March 16, 1948, and assigned to the Westinghouse Electric Corporation.

The invention as hereinafter disclosed is particularly adapted for operating a number of motors which drive sugar centrifugals. However, it will be understood that the invention may be utilized otherwise, for example, in cargo winches, towing winches, etc.

With constant current systems used to drive a motor of sugar centrifugal motors, it is possible to operate these motors such that some may be starting, some running, and some braking at the same instant of time. Thus, the motors which are braking may regenerate into the constant current system, and provide additional energy for operating the motors which are accelerating without producing an additional burden upon the constant current generator. The systems of control hereinafter disclosed, in general, provide constant torque acceleration and braking of the motors with provision for operating the motors at any selected speed within the capacity of the system and maintaining this speed constant once the motor has accelerated to the desired speed.

A principal object of this invention is to provide an electric drive which is simple in its elements and in its operation.

Another object of this invention is to provide an electric drive which includes provisions for obtaining constant torque acceleration and braking of the motor.

Still another object of the invention is to provide an electric drive in which certain electrical characteristics of the motor are utilized to effect a control of the motor.

A further object of the invention is to provide an electric drive which includes provisions for obtaining constant torque acceleration and braking of the motor and constant speed regulation at a selected motor speed.

Figure 1:
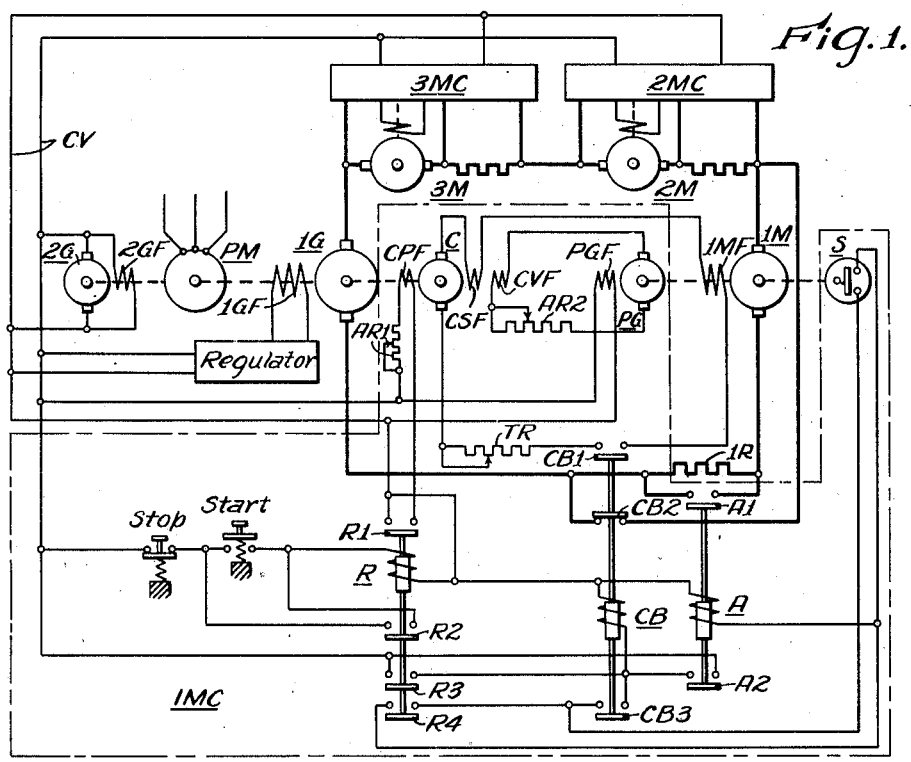
Figure 2:
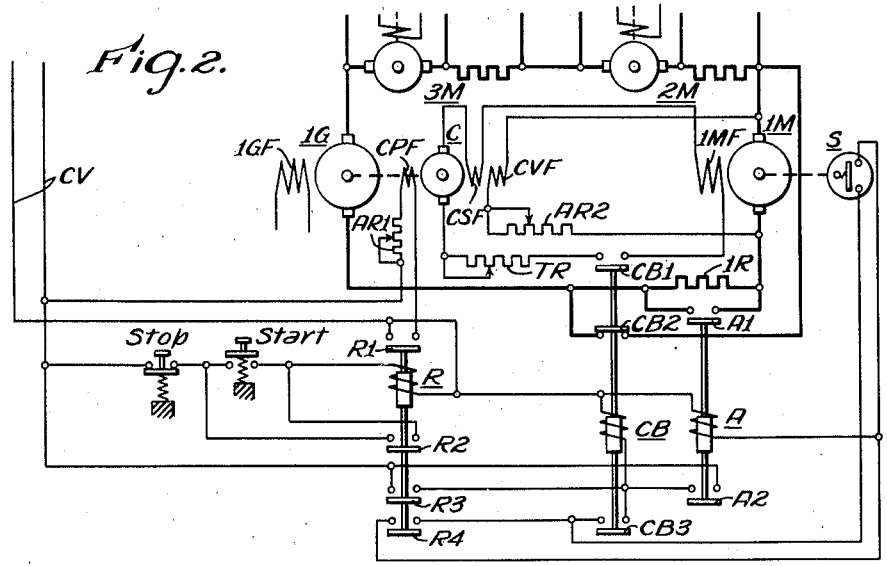
Figure 3:
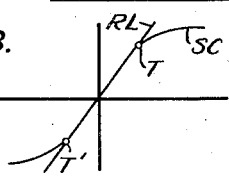

Other objects and advantages will become apparent from a study of the following disclosure when considered in conjunction with the accompanying drawings, in which:

Figure 1 schematically illustrates a constant current electric drive embodying the fundamental principles of this invention;

Fig. 2 is a modification of the invention illustrated in Fig. 1;

Fig. 3 graphically illustrates the operating characteristics of the control generator illustrated in Figs. 1 and 2.

Referring now to Fig. 1 of the drawings, the electric drive illustrated therein comprises, generally, a group of drive motors designated as IM to 3M, inclusive, a constant current generator IG for energizing the armature windings of the drive motors, a constant voltage generator 2G for supplying a constant voltage to certain elements of the control system and a prime mover PM for driving the generators. So much of the drive is common to these motors. Additional control elements for the motor IM are bracketed in the dot-dash outline and designated generally IMC. Similar control elements for the motors 2M and 3M are comprised in the blocks 2MC and 3MC but in the interest of simplicity are not detailed.

The control elements IMC include a control generator C driven by prime mover PM for regulating the motor field winding IMF, and a pilot generator PG driven by the drive motor IM. Suitable magnetic controllers, of which the one designated A is the accelerating relay, the one designated CB is the circuit breaker, and the one designated R is the run relay, are included in the control to effect the desired control over the system elements to which they are connected. The speed responsive switch S introduces a speed control in the system. The control elements thus far described and generally designated IMC are utilized only to control the operation of the driving motor IM. As previously noted the control elements for the driving motors 2M and 3M are respectively designated 2MC and 3MC, and for the purpose of simplifying the illustration of this invention are shown only in block diagram. It will be understood in this connection that the control systems 2MC and 3MC include operating elements such as those indicated in IMC. The prime mover PM, however, may be utilized to drive the control generator such as C of each of these systems.

The balance of the description relating to Fig. 1 will be described in connection with the control system relating to drive motor IM. In this connection, the function of the control system 2MC and 3MC will be understood.

The armature winding of the motor IM is connected in a series loop with the armature winding of the constant current generator IG and a starting resistor IR is connected in this series loop. The constant current generator may be any suitable type, since, per se, it forms no part of this invention. As illustrated, it is provided with a single field winding IGF which is controlled by the output of the Regulator so designated in the drawings. This Regulator for the operating characteristics desired will so regulate the excitation of the single field winding that the armature currents will be maintained at a constant level for any loading or speed of operation of the motor IM. The single field winding IMF for the drive motor is connected in a series loop with the series field CSF for the control generator C, the armature winding thereof and the adjustable resistor TR. It is thus energized according to the electrical output of the control generator C. The control generator C has special operating characteristics which will hereinafter be noted in detail. In addition to the series field winding CSF, the control generator is provided with a pattern field winding CPF which is energized according to the electrical output of the constant voltage generator, designated 2G. The excitation of this pattern field winding may be varied according to the setting of the adjustable resistor AR1 connected in series therewith to obtain variable operating characteristics of the motor. A voltage field winding CVF is also provided and is differentially connected with respect to the field winding CPF. The voltage field winding is adjustably energized depending upon the setting of the adjustable resistor AR2, by the output of the pilot generator PG which is mechanically driven by the drive motor IM. The single field winding PGF for the pilot generator is energized according to the electrical output of the constant voltage generator 2G. Since the field excitation of the pilot generator is a constant value and its speed of rotation varies with the motor speed, its electrical output will vary according to the motor speed. Hence, the excitation of the voltage field winding CVF for the control generator varies according to the speed of the motor IM. The constant voltage generator 2G, as shown, is provided with a single field winding 2GF which is shunt-connected. Any suitable field winding arrangement or control of the field winding arrangement of this generator may be utilized to obtain the desired constant voltage output.

The control generator C is of the self-energizing type. These characteristics are obtained by the use of the series-connected field winding CSF. Winding CSF may be shunt-connected if desired. The adjustable resistor TR is so adjusted in its resistance value that the resistance line of the series field or load circuit is tangent to the initial straight-line portion of the no-load saturation curve of this generator. These characteristics are illustrated graphically in Fig. 5 in which the saturation curve is designated SC, and the resistance line of the load circuit is designated RL. As will be seen from this figure, the resistance line is tangent to the initial portion of the curve as for as the points of tangency T and T'. This generator may thus have a voltage output equal to the ordinate of any of the points of tangency of the two curves. It thereby becomes the function of the voltage and pattern field windings of the control generator to select the proper operating point of this generator along the tangent curves, and to maintain this operating point substantially constant for the particular operating condition.

In this manner, when the pattern and voltage field windings of the control generator are equally energized, the total excitation resulting from these fields is zero, and the electrical output of the control generator at this point is maintained by the self-energizing properties of the machine. Should the voltage field winding CVF drop in its excitation due to a drop in the speed of operation of the motor MI, the pattern field excitation will predominate, and the excitation of this pattern field will be added to that of the self-energizing field to increase the electrical output of the control generator. The motor field winding IMF is thus energized in a higher degree, thus the motor torque and consequently the motor speed are increased. When the speed of the motor increases sufficiently that the excitation of the voltage field winding is equal and opposed to that of the pattern field winding, the self-energizing properties of the regulating generator maintain the electrical output thereof at this new point. Any departure in speed of the motor at this new operating point will again produce a correction due to the differential action of the pattern and voltage field windings to bring the motor speed to its desired value.

Assuming that the constant current generator IG and constant voltage generator 2G are both running at the constant speed controlled by the prime mover PM, the motor IM can be started by pressing the start push button. This causes the relay R to close its contact members R1, thus connecting the control generator pattern field winding CPF across the constant voltage generator 2G. The contact members R2 shunt the start push button and thus maintain the energizing circuit for the coil of the relay R independent of the position of the start push button. The contact members R3 complete an energizing circuit for the coil of the circuit breaker CB also connected across the constant voltage generator. The contact members R4 partially establish an energizing circuit for the coil of the accelerating relay A. Since the coil of the circuit breaker CB is energized, this breaker closes its contact members CB1 to connect the motor field winding IMF across the control generator C. The contact members CB2, which normally shunt the armature of the drive motor IM and its series resistor IR, thus effectively deenergizing the armature winding of this motor, now open, and the constant current output of the generator IG circulates through the armature winding of the drive motor. The drive motor now accelerates with the resistor IR in series therewith. The contact members CB3 in conjunction with the contact members R4 now closed complete the energizing circuit for the coil of the accelerating relay A. The accelerating relay A closes its contact members A1 to shunt the starting resistor IR from its series connection with the armature winding of the drive motor. Its contact members A2 which parallel the contact members R3 provide an energizing circuit for the coil of the circuit breaker and also the accelerating relay A which is independent of the relay R. As the motor accelerates, the speed responsive switch S closes its contact members. These contact members shunt the contact members R4 and thus provide a parallel path for energizing the relay A which is independent of the relay R. This switch may be set to operate for both its closing and opening movements at fairly low speeds of the motor.

As the motor accelerates, the electrical output of the pilot generator increases, thus gradually reducing the net excitation of the control generator. During the early period of acceleration of the motor, the control generator may work well up on its saturation curve to thus maintain a substantially constant excitation of the motor field winding MF. Since the torque of the motor is proportional to the product of the field flux and the motor armature current, and both of these values during the accelerating period are maintained constant, the torque of the motor is constant. As the motor comes up to the speed selected by the setting of the adjustable rheostat AR1, the excitation of the voltage field approaches that of the pattern field and may become slightly greater than that of the pattern field. As a result, the operating point of the control generator is moved down along the tangent curves until a point is reached at which the motor field excitation is just sufficient to maintain the necessary driving torque for the motor. At this point the speed of the motor is maintained substantially constant by the action of the pattern and voltage fields of the control generator.

To stop the system, the stop push button is pressed. This deenergizes the relay R which immediately opens its contact members R1 to deenergize the pattern field winding CPF. The field excitation of the control generator is thus due to that of the voltage field. Since this field is reversed with respect to the pattern field, the electrical output of the control generator is reversed, and consequently, the motor field winding MF is reversed in its excitation. The electrical output of the control generator now adjusts itself to some substantially constant value along the saturation curve, and thereby maintains the excitation of the motor field winding constant to provide a constant decelerating torque for the motor. As the motor decelerates towards zero speed the zero speed switch S opens. Since contact R4 is now open this deenergizes the accelerating relay A which opens its contacts A1 to insert the resistor 1R in the motor circuit and opens its contacts A2 to deenergize the circuit breaker CB. The contacts CB2 short the motor armature and the series resistor 1R from the constant current circuit and the contact members CB1 open the energizing circuit for the motor field MF thereby completely deenergizing the motor.

The embodiment of the invention illustrated in Fig. 2 of the drawings in fundamental principle is similar to that illustrated in Fig. 1. In an effort to simplify this illustration, the motor controls 2MC and 3MC as well as the prime mover and the constant voltage generator have been eliminated. Their function in the system, however, will be understood in connection with Fig. 1. The conductors connected to the constant voltage source as in Fig. 1 are designated CV. The control field winding for the constant current generator 1G, while not so illustrated, is again energized according to the output of a suitable regulator such as that illustrated in Fig. 1. The main difference of the invention of Fig. 2 over that of Fig. 1 resides in the elimination of the pilot generator PG. The voltage field winding and the adjustable resistor AR2 connected in series therewith are now connected across the motor armature terminals. The voltage field winding is thus energized by the counter voltage of the motor which varies substantially according to variations in the motor speed since the armature currents are for all practical purposes constant. An arrangement such as this is suitable in applications which do not require an extremely accurate control of the running speed of the motor. If the motor armature currents could be maintained absolutely constant, then the counter voltage would be an accurate indication of the motor speed. However, some slight variation in motor armature current will occur before the regulating equipment of the constant current generator can provide suitable corrections in the field excitation of this generator to correct the current change. As a result, some slight deviation of the motor counter voltage will occur as the result of the current change.

The system as illustrated in Fig. 2 being otherwise the same as that illustrated in Fig. 1, will be understood in connection with the description of Fig. 1.

The foregoing disclosure and the showings made in the drawings are merely illustrative of the principles of this invention and are not to be interpreted in a limiting sense. The only limitations are to be determined from the scope of the appended claims.

I claim as my invention:

1. In an electric drive, the combination of, a motor having an armature winding and a field winding, means for supplying a constant electrical current to the armature winding, a self-energizing control generator having field winding means, said generator being adjusted so that the resistance line of the load circuit thereof is tangent to the initial portion of the no-load saturation curve of the generator, means for applying a constant electrical quantity to said field winding means, means for differentially applying an electrical quantity which varies in dependence of motor speed to said field winding means, and means for energizing the field winding of said motor with the output of said control generator.

2. In an electric drive, the combination of, a motor having an armature winding and a field winding, means for supplying a constant electrical current to the motor armature winding, a generator for energizing the motor field winding, a pair of differentially connected field windings for the generator, means for producing a constant electrical potential for energizing one of the differentially connected field windings, means for producing an electrical potential which varies according to the motor speed for energizing the other of said differentially connected field windings, means including a field winding for the generator for imparting self-energizing properties to the generator, means for adjusting the resistance line of the generator load circuit so that the resistance line thereof is tangent to the initial straight line portion of the no-load saturation curve of the generator, and means for de-energizing said one of the differentially connected field windings during decelerating periods of said motor.

3. In an electric drive, the combination of, a motor having an armature winding and a field winding, means for supplying a constant electrical current to the motor armature winding, a generator for energizing the motor field winding, a pair of differentially connected field windings for the generator, means for producing a constant electrical potential for energizing one of the field windings, means for producing an electrical potential which varies according to the motor speed for energizing the other of said differentially connected field windings, and means including a series connected field winding for the regulating generator and a resistor in series therewith for setting the resistance of the series field circuit such that its resistance line is tangent to the initial straight line portion of the no-load saturation curve of the generator.

4. In an electric drive, the combination of, a motor having an armature winding and a field winding, means for supplying a constant electrical current to the motor armature winding, a generator having an armature winding, a series field winding and a pair of differentially related field windings, circuit means connecting the armature winding and the series field winding of the generator in series with the field winding of the motor, means providing a resistance of the armature circuit of the generator of a value that the slope of the resistance line thereof is substantially tangent to the initial straight line portion of the no-load saturation curve of the generator, means for applying a voltage of constant magnitude to one of said differentially related field windings, and means for applying a voltage varying in magnitude with an operating quantity of the motor to the other of the differentially related field windings.

5. In an electric drive, the combination of, a motor having an armature winding and a field winding, means for supplying a constant electrical current to the motor armature winding, a generator having an armature winding, a series field winding and a pair of differentially related field windings, circuit means connecting the armature winding and the series field winding of the generator in series with the field winding of the motor, means providing a resistance of the armature circuit of the generator of a value that the slope of the resistance line thereof is substantially tangent to the initial straight line portion of the no-load saturation curve of the generator, means for applying a voltage of constant magnitude to one of said differentially related field windings, and circuit means connecting the other of said differentially related field windings across the armature terminals of said motor.

6. In an electric drive, the combination of, a motor having an armature winding and a field winding, means for supplying a constant electrical current to the motor armature winding a generator having an armature winding, a series field winding and a pair of differentially related field windings, circuit means connecting the armature winding and the series field winding of the generator in series with the field winding of the motor, means providing a resistance of the armature circuit of the generator of a value that the slope of the resistance line thereof is substantially tangent to the initial straight line portion of the no-load saturation curve of the generator, means for applying a voltage of constant magnitude to one of said differentially related field windings, a pilot generator driven by said motor, and circuit means connecting the other of said differentially related field windings to said pilot generator to be energized thereby.

7. In an electric drive, the combination of, a motor having an armature winding and a field winding, a resistor in series with said armature winding and an accelerating relay for shunting said resistor upon energization of the relay, a contactor normally shunting the resistor and armature winding of the motor, which contactor when energized removes said shunt, means for producing a constant electric current connected in circuit with said motor armature winding and resistor, an exciter generator for producing a constant voltage, a generator having a pair of differentially related field windings, circuit means connecting the armature of said generator to the motor field winding, a run relay which when energized connects said exciter generator to one of the differentially related field windings, means for energizing the run relay, normally open contact means on the run relay for partially establishing an energizing circuit for the accelerating relay, motor speed responsive means for completing the energizing circuit for the accelerating relay, normally open contact means on the run relay for energizing said contactor, and means for energizing the other of said differentially related field windings in dependence of the speed of said motor.

GEORGE E. KING.

REFERENCES CITED

The following references are of record in the file of this patent:

UNITED STATES PATENTS

| Number | Name | Date |
| --- | --- | --- |
| 2,323,741 | Watson | July 6, 1943 |
| 2,361,212 | King | Oct. 24, 1944 |